United States Patent [19]
Hines

[11] 3,863,888
[45] Feb. 4, 1975

[54] POWER OPERATED FLUID CONTROL VALVE

[76] Inventor: Paul D. Hines, 9634 Farragut Dr., Culver City, Calif. 90230

[22] Filed: Jan. 15, 1973

[21] Appl. No.: 323,995

[52] U.S. Cl.................. 251/130, 251/133, 251/134
[51] Int. Cl............................................ F16k 31/05
[58] Field of Search ............ 251/133, 134, 59, 135, 251/136, 65, 340, 130, 138

[56] References Cited
UNITED STATES PATENTS

| | | | |
|---|---|---|---|
| 2,317,549 | 4/1943 | Muller et al. | 251/134 |
| 2,743,897 | 5/1956 | Elliott et al. | 251/59 |
| 2,792,194 | 5/1957 | Huck | 251/65 |
| 2,860,266 | 11/1958 | Schrader | 251/133 X |
| 2,878,687 | 3/1959 | Kron et al. | 251/134 X |
| 2,982,516 | 5/1961 | Maienknecht | 251/340 |

Primary Examiner—Arnold Rosenthal
Attorney, Agent, or Firm—Henry M. Bissell

[57] ABSTRACT

A motor operated fluid valve has a non-rotatable but axially movable hollow valve sleeve or stem disposed in an axial flow passage. A motor with a stator and hollow rotor concentric with the flow passage is integrally mounted in the valve housing. The rotary motion of the rotor is transformed into linear motion of the valve stem along the axial flow passage by threaded connections between the stem and the rotor. A pair of bevel gears disposed respectively on one end of the rotor and on the housing offset from the flow passage transform rotary motion of the rotor through the bevel gears to a laterally disposed shaft. The shaft has an indicator nut threaded for linear movement corresponding to the rotary movement of the shaft and disposed to actuate a pair of limit switches connected to limit travel of the motor. The valve stem has a disc in one end for operational contact with a valve closure and has an axial bore communicating with the axial flow passage through radial openings therein when the valve stem is unseated from the valve closure.

16 Claims, 1 Drawing Figure

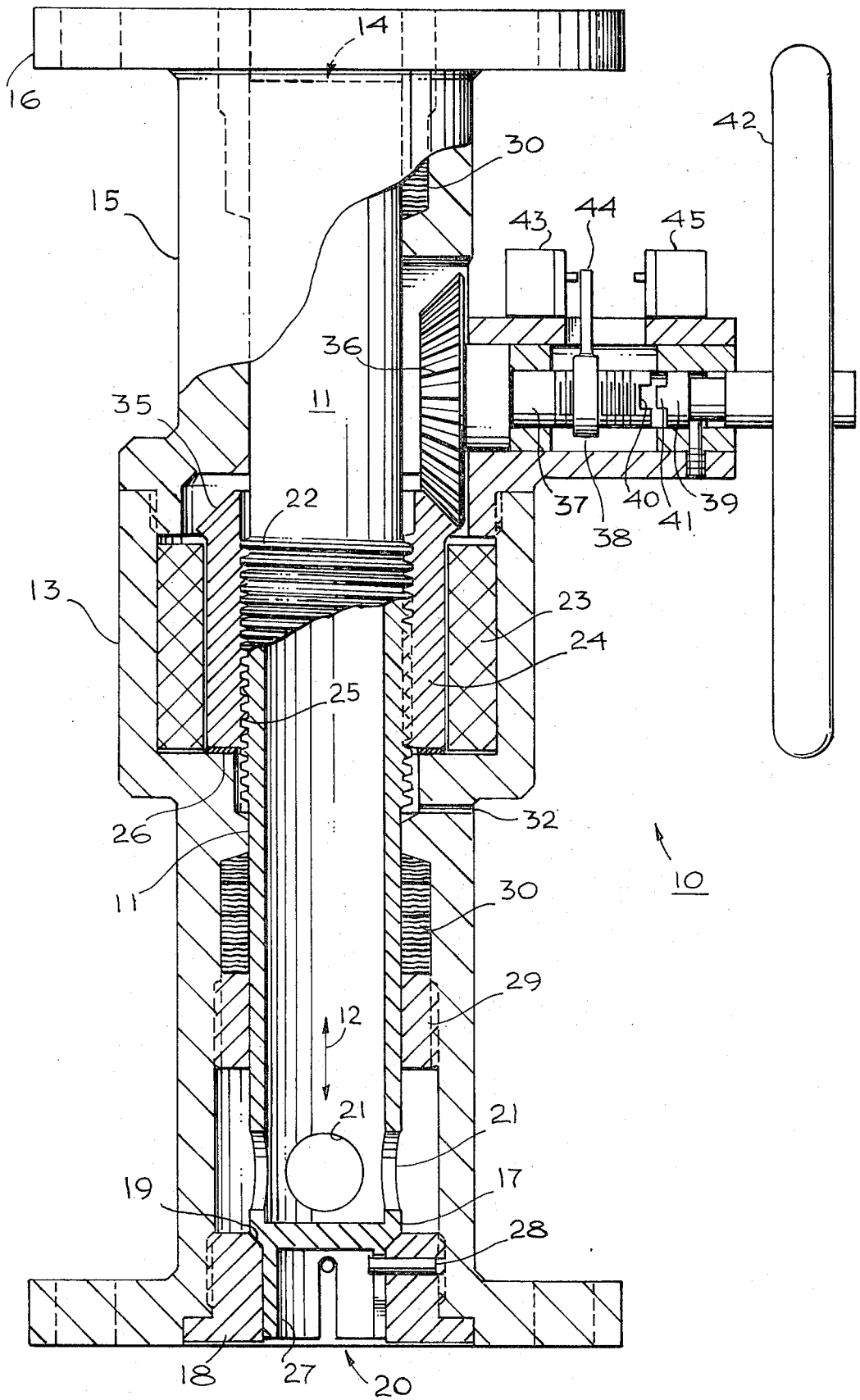

POWER OPERATED FLUID CONTROL VALVE

BACKGROUND OF THE INVENTION

1. Field of the Invention

This invention relates to power driven actuating valves and in particular to a motor operated fluid valve in which linear motion along an axial flow passage may be imparted to a hollow valve stem by the rotary motion of the motor operated driving member.

2. Description of the Prior Art

Fluid flow systems in industrial plants, ships and the like require many valves for use in the large number of pipe lines required by such systems. The pipe lines require an extensive number of valves to control the fluid therein with the amount of space taken up by the valves occupying a high percentage of the total space available. Additional space is required in manual valves wherein the services of attendants are required to operate the valves. Since prior art valves are designed to be mounted to the pipe in lateral directions to the flow passage therethrough, the space taken up by the valve often exceeds that of the pipe.

In installations where motorized valves have taken the place of manual valves, the valves are even larger than the manual operated valves and typically include large gear and motor configurations which are attached to the pipe systems.

Further, it is often desirable, and a design requirement, to provide a valve which may be operated by hand as well as by motor driving means to increase reliability if the motor should fail. This further increases the size of the valve and space required for manual access, presenting a serious space problem to the pipe system designer. In a modern ship, for example, with its tremendous amount of pipes, the space requirement for valves is of paramount importance. While a large number of power operated valves are known in the art and while some of these valves may be operationally operated by hand and are designed to operate efficiently and reliably, there still remains the unsolved problem of providing a valve within the confines of the limited space available in pipe systems.

Known prior art motor-actuated valves which are used to operate valves through mechanisms including gears and wheels commonly use a hand wheel or electric motor to operate a mechanism to open and close the valve. The mechanism for operating the valve usually takes up as much space as the pipe since the electric motor and hand operating means must be attached laterally to the housing of the valve and necessarily extends in a direction normal to the flow passage which greatly enlarges the space taken up by the combined pipe and valve.

Thus, in the prior art design of valve actuators for operating pipe systems with a hand and motor operated valve, it is readily apparent to the designer that the space occupied by the valve is considerably larger than the space occupied by the pipe which presents a serious, practical and, to date, unsolved problem to the designer attempting to meet stringent space requirements for the pipe system. There is therefore a critical need for a valve that may be adapted to fit in a pipe system in a compact space.

In order to provide a pipe system that occupies less space, the motor valve actuating mechanism must be designed to conform with the geometry of the pipe system and in accordance with the fluid flow passages therein. The valve actuating mechanism should extend outwardly from the pipe as little as possible.

Accordingly, it is a major object of this invention to provide an improved motorized operating valve of smaller size than prior art valves.

SUMMARY OF THE INVENTION

In brief, the motorized valve of the present invention includes a non-rotatable but axially movable hollow valve stem or sleeve disposed in an axial flow passage of a valve housing. A motor with a stator and a hollow rotor concentric with the flow passage is integrally mounted in the valve housing. The hollow opening of the rotor is adapted to receive the valve stem therethrough. The valve stem has a valve closing at one end of the flow passage with radial ports therein to direct fluid flow to the flow passage when the valve is open. The axial bore of the valve stem communicates with the flow passage through the radial openings when the stem is away from the valve seat and has a closed disc at one end fitting into the valve seat for closing the valve.

An important aspect of this invention is the manner in which the valve actuating mechanism controls movement of the valve stem. The concentrically mounted stator and hollow rotor are formed as an integral part of the valve housing. The inner periphery of the rotor forms an opening through which the valve stem is extended and is threaded for rotatably engaging corresponding mating external threads on a portion of the valve stem, whereby rotary motion of the rotor is converted to linear motion of the valve stem along the flow passage. Alternate hand operation of the valve, when the motor is inoperative, is provided by a manually displaceable hand wheel adapted for detachable connection to a drive shaft to transmit hand motion to the rotor of the motor through a pair of bevel gears. One gear is laterally disposed to the axial flow passage and is adapted to be rotated by a manual shaft. The other gear is attached to one end of the rotor and meshes with the one gear to rotate the rotor upon rotation of the bevel gear attached to the hand shaft. An indicator is provided on the shaft and is linearly movable in response to rotary movement of the shaft to indicate the amount of travel of the valve and also to move between a pair of limit switches to define the limits of travel of the valve stem.

In the motor operated mechanism of the present invention, wherein the motor is mounted concentric with the axial flow passage forming an integral part of the housing, the entire mechanism including the valve is extremely compact compared to prior art motor operated valves wherein the motor is laterally mounted outside of the valve housing. Also, by causing the rotary motion of the rotor to be converted to linear motion of the valve stem an efficient and compact design of the valve is realized.

In a preferred embodiment of the invention, the motor operated in conjunction with an in-line valve wherein the flow of fluid along an axial flow passage is controlled by the valve stem disposed in the flow passage and movable therewith. In such an in-line valve operation, the geometry is especially compact with the valve actuator mechanism including the motor and valve stem being completely integral with the housing of the valve and concentric with the flow passage. The motor operated valve is sufficiently compact to enable its use in a limited space and therefore is peculiarly suitable for installation where space is at a premium, as on shipboard, for example, as well as for general use in industrial pipe systems application.

Although systems and devices in accordance with this invention are best described in conjunction with an in-line valve it is to be understood that the motor operated mechanism of the invention can be utilized with other types of valve such as gate valves and check valves, in a similar compact arrangement. Also, while in the preferred embodiment the alternate form of operation with the hand wheel is shown it should be realized that if the valve were designed with the motor operated mechanism only, even more saving in size could be realized.

DESCRIPTION OF THE DRAWING

A better understanding of the present invention may be had from a consideration of the following detailed description, taken in conjunction with the accompanying drawing, in which:

The sole FIGURE is an elevation view of the valve according to the preferred embodiment of the invention, which view is partly in section and partly broken away to more clearly illustrate the device of the invention.

DESCRIPTION OF A PREFERRED EMBODIMENT

While the mechanism of the present invention may be used to control the operation of a hollow valve stem or of any device by which a controlled stem or shaft is operated, its manner of operation can be readily understood from its description of its association with the valve as illustrated in FIG. 1. The valve illustrated in the drawing is intended to be representative of a variety of valves and in particular, according to the preferred embodiment, a valve for controlling the in-line passage of fluid along an axial flow passage.

The valve illustrated in the drawing, shown generally at 10, is commonly known in the art as an in-line valve, wherein a valve stem 11 moves axially within an axial flow passage indicated by the arrows 12 in a manner to be described.

The valve 10 includes a valve housing 13 and a bonnet 15 at the upper end thereof which may be flanged at 16 and suitably fixed to the housing 13. The valve sleeve or stem 11 fits in the axial flow passage and is hollow, being open at the upper end port location 14 and closed at the lower end location 20 by a disc portion 17 which is adapted to set in a valve closure 18 having a valve seat 19 at the lower end of the stem 11. The hollow valve stem 11 has an inner bore for passing fluid through the axial flow passage indicated by the arrows 12 when the valve stem 11 is away from the valve seat 19 with the valve being in the open position (not shown). However, as illustrated, the valve is in the closed position with the disc portion 17 seated against the seat 19 and preventing the flow of fluid therethrough. The lower end of the valve stem 11 has ports 21 suitably arranged therearound to provide a flow passage between the inner bore of the valve stem 11 and the lower end port location 20 when the valve is in the open position with the valve stem 11 away from the valve seat 19.

The valve stem 11 is externally threaded at a mid portion thereof with threads 22 extending along the valve stem 11 a length determined by the desired linear travel of the valve stem 11. The threads 22 may preferably be of the large coarse type, such as Acme type, and are driven in a manner to be described, to impart linear motion to the valve stem 11.

According to a major aspect of the invention, linear motion is imparted to the valve stem 11 through the threads 22 by motor driven apparatus which includes a motor having a stator 23 and a hollow rotor 24 concentrically mounted within the valve housing 13 about the axial flow passage. The rotor 24 is hollow having an opening for receiving the valve stem 11 therethrough and has its inner periphery threaded with threads 25 preferably of the Acme type, which are adapted to match and engage with the external threads 22 mounted on the outer periphery of the valve stem 11.

The driving mechanism of the stator 23 and rotor 24 may be any suitable electric motor such as an induction type with the stator 23 suitably mounted to the housing 13 such as with bolts or the like, and the rotor 24 made hollow and positioned to turn in the threaded engagement with the valve stem threads 22 and the rotor threads 25. A suitable bearing ring 26 located between the lower end of the rotor 24 and the housing 13 supports the lower end rotor 24 in the housing 13. The integral mounting of the stator 23 and the rotor 24 within the valve housing 13 provides a maximum efficiency in achieving the design objective of minimum space occupied by the motor actuating mechanism.

In the operation of the motor, the stator 23 imparts rotary motion to the rotor 24 with the rotor threads 25 engaging the valve stem threads 22 causing the valve stem 11 to move linearly in the axial flow passage as indicated by the arrows 12 and in operational relationship with the valve closure 18.

The lower portion of the valve stem 11 has guides 27 extending in the axial flow passage through the lower end port 20 to guide the valve stem 11 in its movement and is suitably slotted to receive guide pins 28 which may be press fitted into the valve closure 18 to prevent rotation of the valve stem 11 during the threaded engagement with the rotor 24.

The valve closure 18 may be removable and is flanged or fastened in place with counterscrews or the like, according to means well known in the art.

The valve 10 is provided with suitable packing glands 29 which may be threaded into the valve housing 13 and bonnet stuffing boxes 30 for sealable operation of the valve stem 11 within the flow passage. These may be replaced in accordance with standard design by suitable O-rings with sealing grooves machined into the housing 13 and the bonnet 15 as illustrated. Additionally, a tell-tail hole 32 may be provided for visual indication of leakage.

The rotor 24 has attached to its upper end a bevel gear 35 which is threadably engaged to a bevel gear 36 disposed in the lower end of the bonnet 15 and laterally offset from the valve normal to the axial flow passage. The bevel gear 36 is mounted around a shaft 37 which is threaded and extends from one side of the bonnet 15. The threaded shaft 37 has an indicator nut 38 attached thereto for linear movement on the shaft 37 in response to rotary movement of the shat. The shaft 37 is detachably engaged with a stem 39 being slotted at its end 40 to engage a cooperating extension 41 of the stem 39. A hand wheel 42 is disposed to turn the shaft 37 when the stem 39 is engaged therewith.

The valve stem 11 may be operated by turning the hand wheel 42 which rotates bevel gears 36 and 35 turning the rotor 24 which, in turn, imparts linear motion to the valve stem 11 to open and close the valve.

Limit switches 43 and 45 are suitably mounted to the bonnet 15 and are in contact with an upper extension 44 of the indicator nut 38 whereby the upper and lower limits of travel of the valve stem 11 may be set. Electrical circuitry (not shown because it is well known in the art) may be provided to be responsive to the limit switches 43 and 45 to control the motor for limiting the travel of the valve stem 11.

The motor operation of the valve occurs when, in response to standard electrical control circuitry, the field coils on the stator 23 cause the rotor 24 to rotate which, through the engagement between threads 22 at 25 causes linear motion of the valve stem 11 along the axial flow passage. The engaging bevel gears 35 and 36, rotating with corresponding movement of the rotor 24, rotate the shaft 37 with the nut 38 moving between switches 43 and 45.

The valve may also be operated manually which is accomplished by means of the hand wheel 42 which, when engaged with the shaft 37 via mating key members 40, 41 causes the bevel gear 36 to engage with the bevel gear 35 to rotate the rotor 24, causing linear motion of the valve stem 11.

The motor as illustrated shows the stator 23 and the rotor 24 in operational relationship. The motor may typically be of a type especially adaptable to the high torque and lower speed requirements of the valve. An A-C induction motor designed to operate from a three phase 440 volt supply is desirable for shipboard applications. The induction motor may have a substantial number of poles to cause the rotor to rotate slowly with sufficient torque to operate the valve properly. Alternatively, a brushless motor drive system may be utilized wherein a low speed DC motor of small size can operate in a permanent magnet field construction with a DC wound field. This type of brushless motor takes the place of the well known rectifier DC motor drive and has the advantage of being of small size.

The valve stem 13 in the illustrated drawing is shown in the closed position with the valve stem 11 operating to move upward from the closed position away from the valve seat 19 to open the valve. The extent of the valve opening or closing in terms of the actual position of the valve stem 11 is ascertainable by the indications of indicator 38 and the limit switches 43 and 45. The valve is designed to have the length and movement of the valve stem 11 in accordance with known design features. The valve may be opened or closed or the amount of flow of the fluid flowing through the fluid openings may be controlled by the closure or amount of opening of the valve.

Of primary importance to the apparatus of the invention is the fact that the motor is mounted integrally with the housing and concentric with the axial flow passage, thereby providing a valve to meet minimum space requirements. The significance of this construction can readily be ascertained by comparing it to motor operated valves of the prior art wherein the motor must fit along the side of the pipe in an extensive offset housing which thereby greatly enlarges the size of the mechanism.

Although there has been described above one specific arrangement of a motor operated fluid valve in accordance with the invention for the purpose of illustrating the manner in which the invention may be used to advantage it will be appreciated that the invention is not limited thereto. Accordingly, any and all modifications, variations or equivalent arrangements which fall within the scope of the annexed claims should be considered to be a part of the invention.

What is claimed is:

1. A power operated valve having an axial flow passage;
   a non-rotatable but axially movable hollow valve stem in the axial flow passage in operating relationship with a valve closure;
   said valve stem having external threads around a portion thereof;
   motor means including a stator and a hollow rotor concentric with the axial flow passage;
   said rotor having internal threads for engaging said external threads in operational movement.

2. The power operated valve recited in claim 1, wherein said valve stem has an axial bore communicating with the axial flow passage through radial openings when said valve stem is away from the valve closure.

3. The power operated valve recited in claim 2, wherein is included a detachable manually actuated shaft, and bevel gear connection means for connecting said shaft to said rotor for manually rotating said rotor when said motor means is inactive.

4. The power operated valve recited in claim 3, wherein said bevel gear connection means comprises a pair of engaging bevel gears, one of said gears mounted on one end of said rotor and the other of said gears mounted for movement with said shaft.

5. The power operated valve recited in claim 3, wherein is included means for indicating the amount of travel of said valve stem.

6. The power operated valve recited in claim 5, wherein said indicator means is threadably mounted on said shaft and movable therewith to indicate the amount of movement of said valve stem.

7. The power operated valve recited in claim 6, further including travel limit switches coupled in the motor energization circuit and positioned respectively for actuation by the indicator means at opposite limits of its travel.

8. The power operated valve recited in claim 1, wherein said external threads and said internal threads are Acme type threads adapted for operational engagement therebetween.

9. The power operated valve recited in claim 1, wherein one end of said rotor has a bevel gear attached thereto for rotating with said rotor and wherein is included a second bevel gear operationally connected to said first bevel ger and mounted for rotation about a lateral axis with respect to the axis of the axial flow passage.

10. The power operated valve recited in claim 9, wherein is included a detachable manually actuated wheel for rotating the second bevel gear doing manual operations when said motor means is inactive.

11. Apparatus for controlling fluid flow in an axial flow passage comprising:
   a non-rotatable but axially movable valve stem in the flow passage in operating relationship with a valve closure;
   rotary movement means coupled to the end of said valve stem remote from said valve closure and positioned in concentric relationship with the flow passage;

means connecting said valve stem and said rotary movement means for converting rotary motion of said rotary movement means into axial motion of said valve stem;

and self-contained concentrically-aligned electric motor means for driving said rotary movement means; gear whereby said valve stem is linearly displaced along the axial flow passage from said valve closure by an amount proportional to the rotary movement of said rotary movement means.

12. The apparatus recited in claim 11, wherein said means for driving said rotary movement means includes a stator operatively associated with said rotary means in electric motor relationship wherein said rotary movement means operates as the rotor of the electric motor.

13. The apparatus recited in claim 12, wherein is included detachable manually actuated means and drive means connected to the manually actuated means and the rotary movement means when attached, for effecting rotary motion of the rotary movement means independent of said electric motor operation.

14. The apparatus recited in claim 13, wherein said means for connecting said valve stem and said rotor comprises a pair of screw threads respectively attached to said valve stem and said rotor for operational engagement therewith.

15. The apparatus recited in claim 13, wherein is included limit switch means attached to said drive means and responsive to the movement of said rotary movement means for limiting the travel of said valve stem.

16. In combination with a hollow armature rotor of a motor;

a hollow valve stem extending through said hollow rotor and threaded at the outer portion thereof, said valve stem and rotor containing an axial fluid flow passage therein; and means connecting said valve stem and said rotor for converting the rotary movement of said rotor into axial movement of said valve stem, whereby said valve stem is linearly displaced along an axial flow passage from the valve closure by an amount proportional to the rotary movement of said rotor.

* * * * *